Sept. 16, 1969
C. H. PERKINS
3,467,123
FLUID CONTROL SYSTEM
Filed Sept. 23, 1966
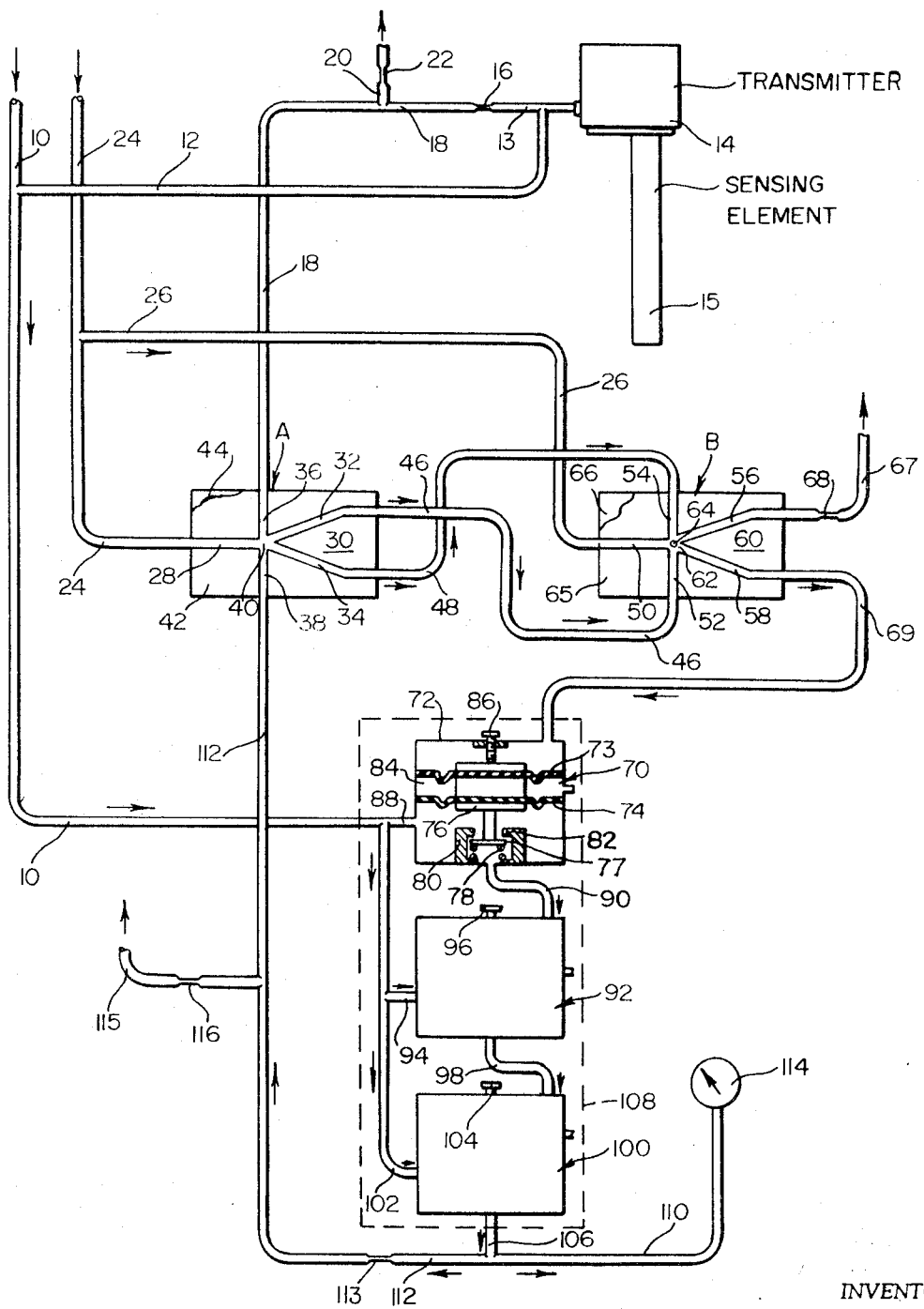
INVENTOR
Charles H. Perkins
BY Anthony A. O'Brien
ATTORNEY

United States Patent Office 3,467,123
Patented Sept. 16, 1969

3,467,123
FLUID CONTROL SYSTEM
Charles H. Perkins, Richmond, Va., assignor to Robertshaw Controls Company, Richmond, Va., a corporation of Delaware
Filed Sept. 23, 1966, Ser. No. 581,624
Int. Cl. F15c 1/08
U.S. Cl. 137—81.5                                   11 Claims

ABSTRACT OF THE DISCLOSURE

A fluid control system combining a pair of operatively interconnected proportional fluid amplifiers with a feedback network characterized by the utilization of pressure responsive diaphragms therein. Power stream of fluid amplifiers is deflected by input signals from pair of opposed control signals, said stream and said jets operating at extremely low pressure levels, e.g., .433 p.s.i. Low pressure output signal in feedback network connected to output channel of fluid amplifiers is increased in pressure by said booster relays to cause adjustment in setting of controller. One control signal is produced by fluid transmitter, whereas second control signal is produced by feedback network after suitable pressure reduction.

---

This invention relates generally to fluid control systems and, more particularly, to fluid control systems employing fluid amplifiers that have no moving parts.

Prior fluid control systems have relied upon relays and amplifiers having moving parts, such as flapper valves, diaphragm valves, and the like, to regulate the fluid flow through the control system. These moving parts have an inertial resistance that prevents accurate control or regulation until the fluid flow has attained a certain threshold pressure dependent upon the number and size of the moving parts within the system. Such systems, therefore, have been limited in application to control systems operating at a pressure level above the threshold pressure for the system.

Accordingly, it is an object of the present invention to construct a fluid control system combining the use of fluid amplifiers having no moving parts with booster relays to achieve increased reliability of operation, particularly at extremely low pressure levels.

Another object of the present invention is to achieve a high amplification factor in a compact and simplified fluid control system.

Another object of the present invention is to provide a fluid control system in which a time lag between control signal reception and response thereto is minimized.

A further object of the present invention is to provide a fluid control system with a feedback network that quickly adjusts the system to the desired condition.

The present invention is practiced in a control system including a first conduit connected to a high pressure source and a second conduit connected to a low pressure source, a transmitter connected to the first conduit for producing a first fluid signal, at least one fluid amplifier including an inlet port, control channels and outlet passages, the inlet port being connected to the second conduit, one control channel being connected to the transmitter to receive the first fluid signal therefrom, a feedback network for establishing communication between the outlet passages and a second control channel to transmit a second signal thereto, the fluid flow from the inlet port to the outlet passages being regulated in response to the fluid signals and a pressure responsive controller in communication with the outlet passages for operation in response to the pressure in the outlet passages.

Other objects and advantages of the present invention will become apparent from the following description of a preferred embodiment, taken in connection with the accompanying drawing which includes a single figure of a schematic diagram of a pneumatic control system.

As is shown on the drawing, a main air conduit 10 is connected to a pneumatic source (not shown) having a pressure of approximately 17 p.s.i. A conduit 12 leading from the main air conduit 10 feeds main air pressure to an intermediate portion of signal pipe 13 secured to a remotely located pneumatic temperature transmitter 14. Transmitter 14 may assume any conventional configuration of single-pipe, leak port transmitter, which transmitter includes valve mechanism (not shown) for varying the signal air pressure in pipe 13 in accordance with temperature variations detected by sensing element 15 and for controlling the venting of transmitter 14 to atmosphere through suitable porting within its casing.

Pipe 13 extends away from transmitter 14 to terminate in a fluid resistance or constriction 16 and a conduit 18 extends downstream of such constriction. A vent pipe 20 with a resistance 22 therein is disposed in communication with conduit 18 for further reducing the pressure level of the signal below the pressure level in pipe 13. Conduit 18 terminates at a control nozzle for a first fluid amplifier having no moving parts indicated generally by reference character A.

A second main conduit 24 is connected to another pneumatic source (not shown) having a pressure of approximately 12 inches of water or .433 p.s.i. for conveying fluid input signals to amplifier A. A branch conduit 26 from conduit 24 leads to a second fluid amplifier, indicated generally by reference character B.

Amplifier A is a proportional fluid amplifier such as the type illustrated in U.S. Patent 3,122,165, issued to B. M. Horton on Feb. 25, 1964. Such amplifiers have a power supply channel 28 and a flow divider 30 downstream of supply channel 28 in line with the center of the channel. Divider 30 has a pair of diverging sidewalls extending downstream from the apex of the divider, and output passages 32 and 34 are formed adjacent to the diverging sidewalls of divider 30. A pair of control channels 36 and 38 are disposed at right angles to the power nozzle and downstream therefrom. An interaction chamber 40 is defined between the apex of flow divider 30, control channels 36 and 38, and power channel 28. Amplifier A has a base 42 which is made from a durable plastic or metal block, and the above described configuration is etched from one surface of base 42. Cover plate 44, shown in cutaway section at the upper left hand corner of base 42, seals amplifier A in a fluid tight manner.

Flexible tubes 46 and 48 are disposed in output passages 32 and 34, respectively, and extend to the control channels of a second amplifier B. Amplifier B is also a proportional fluid amplifier similar to amplifier A, having a supply channel 50, a pair of control channels 52 and 54, a pair of output passages 56 and 58 and a flow divider 60. An interaction chamber 62 is formed between these members. Amplifier B, however, also has a venting port 64 centrally located in chamber 62 in line with supply channel 50, and extending at right angles thereto clear through base 65. Base 65 has the above described amplifier configuration formed or etched therein, and a cover plate 66, as shown in a cutaway section, maintains a fluid tight seal over amplifier B except for the communication established by port 64 with ambient pressure.

Output passage 56 vents to atmosphere via pipe 67 and constriction 68 while tube 69 is disposed in output passage 58 to lead the output flow to a first booster relay, designated generally by numeral 70. Relay 70 is the first of a series of cascaded, pneumatic booster relays.

Relay 70 has a housing 72 with a pair of diaphragms 73 and 74 and a movable piston 76 disposed within the housing. A plunger 77 is located at the lower end of piston 76. Spring 78 is seated in chamber 80 at the base of housing 72 and engages plunger 77 to bias piston 76 upwardly. The extent of upward movement of plunger 77, however, is defined by the engagement of plunger 77 with an annular valve seat 82 at the inlet to chamber 80. A venting chamber 84 is located intermediate flexible diaphragms 73 and 74, and a manually settable control knob 86 is located atop housing 72. Relay 70 is connected by inlet conduit 88 to the high pressure fluid in conduit 12. The output pressure exits from relay 70 through chamber 80 and flows over outlet connection 90 into the second booster relay 92.

Relay 92 has the same internal construction as relay 70, and therefore, such details are not shown. Relay 92 is responsive to the differences in pressures introduced by outlet connection 90 from relay 70 and inlet conduit 94, which is connected to main air conduit 10. A manually adjustable control knob 96 is located atop the housing for this relay, and an outlet connection 98 conveys an output signal from relay 92 to a third booster relay 100.

Booster relay 100 has the same internal configuration as relays 70 and 92. Relay 100 is responsive to the differences in pressure introduced by outlet connection 98 from relay 92 and by inlet conduit 102, which is connected to the terminal portion of main air conduit 10. A manually adjustable control knob 104 is located atop the housing for relay 100. The outlet connection 106 for relay 100 extends to the exterior of housing 108, indicated by dotted lines. Such housing encases all of the relays in the booster section.

A pair of conduits 110 and 112 is joined to output connection 106 at an inverted, T-shaped joint. Conduit 110 transmits the pressure in connection 106 to final controller 114, which is responsive to such pressure to operate a control element. While controller 114 is represented by a gauge, such element could be a furnace or air conditioner control valve that would be operable to alter the condition sensed by sensing element 15.

The second conduit 112 is a portion of the feedback network, which also includes the booster relays, for returning the flow through output channel 58 in amplifier B to a control channel in amplifier A. Conduit 112 has a fluid resistance or constriction 113 downstream of outlet connection 106 and a vent pipe 115 with a constriction 116 therein downstream of fluid resistance 113 to proportionately reduce the pressure level of the fluid signal to a low pressure level measured in inches of water.

The pneumatic control system described in structural detail above functions in the following manner. The directional arrows in the drawing indicate the flow paths through the control system.

Conduit 10 introduces a stream of air at approximately 17 p.s.i. into communication with transmitter 14 by way of branch conduit 12 and pipe 13. Sensing element 15 of transmitter 14, which senses a variable condition such as temperature, causes the transmitter to vary the pressure in pipe 13 in response to these variations in temperature.

Transmitter 14 produces a signal of relatively high pressure, in the range of 3–15 p.s.i., the exact pressure value being determined in accordance with the temperature sensed by element 15. Such signal is reduced proportionally by the fluid restrictor network including series restrictor 16 and parallel restrictor 22 to a pressure range of 0–6 inches of water, or 0–.216 p.s.i. This pressure reduction is desirable because, as noted above, transmitter 14 is a "leak port" device and as such, can not have a power relay associated therewith. Accordingly, the output pressure of transmitter 14 in pipe 13 is very sensitive to variations in output flow rate. This fluid signal, after the above described pressure reduction, is introduced into amplifier A at inlet channel 36. In order to effectively operate controller 114, which is responsive to pressures in the range of 3–15 p.s.i., the low pressure signal entering channel 36 is amplified in passing through the pneumatic circuitry to return to its original high pressure state in the manner described hereinafter.

Conduit 10 also introduces air at a pressure of approximately 17 p.s.i. into inlet conduits 88, 94 and 102 for serially connected relays 70, 92 and 100, respectively. Outlet connection 106 of booster 100 discharges the output flow from the relay section into feedback conduit 112, which conduit terminates in control channel 38 of amplifier A.

Conduit 24 introduces fluid from a low pressure source at a pressure of 12 inches of water, or .433 p.s.i. into supply channel 28 of amplifier A. In the absence of a control signal from control channels 36 and 38, fluid is discharged against the apex of flow divider 30, which splits the flow into two equal streams that flow through output passages 32 and 34. When a low-level control signal is received, either from transmitter 14 or from feedback conduit 112, or from both sources, the control channels discharge a fluid signal into interaction chamber 40 at right angles to the main stream issuing from supply channel 28. The higher the pressure level of the signal issuing from channel 38, the greater the proportion of fluid flow diverted into output passage 32; conversely, the higher the pressure level of the signal issuing from channel 36, the greater the proportion of flow deflected into output channel 34.

Amplifier A, in this preferred embodiment, achieves a gain of 6. Gain is defined as the ratio of the change in output pressure in relation to the changes in control signal pressure.

Output passages 32 and 34 are cross-coupled to control channels 52 and 54 of amplifier B to further amplify the fluid signal. Branch conduit 26 introduces fluid at a pressure of 12 inches of water into supply channel 50 of staged amplifier B.

Amplifier B is also a proportional amplifier, and the control signals issuing from channels 52 and 54 contact the main fluid stream in interaction chamber 62 and proportionally deflect the same into output passages 56 and 58. In the absence of a control signal, or when the control signals are equal in magnitude, indicating a dynamic equilibrium condition in the control system, the fluid issuing from channel 50 will be divided by contacting the apex of flow divider 60 and will exit in equal streams through passages 56 and 58. The higher the pressure level of the control signal issuing from channel 52, with reference to the pressure level at channel 54, the greater the proportion of fluid that will be deflected into output passage 56. Conversely, the higher the pressure level of the control signal issuing from channel 54, with reference to the pressure level at channel 52, the greater the proportion of fluid that will be deflected into output passage 58 to flow into the feedback network. Venting port 64 is employed to minimize the problems of fluid turbulence or "noise" inherent in the staging of a plurality of fluid amplifiers.

The fluid stream flowing through output passages 56 is vented to the atmosphere, whereas the fluid stream exciting from passage 589 is returned by conduit 69 to the feedback network including booster relays and feedback conduit. Amplifier B also has a pressure gain of 6, so that the pressure level of the signal passing over conduit 69 to booster relay 70 has been increased by a factor of 36.

Conduit 69 leads the fluid flow from passage 58 into the first booster relay 70 of the cascaded relays, which will further increase the pressure level of the signal issuing from passage 58 as well as increasing the volume of such fluid flow. The fluid flow from conduit 69 acts upon upper diaphragm 73. Relay 70 is also pressurized over inlet conduit 88 from a high pressure source connected to conduit 10, and such pressure acts upon lower diaphragm 74. Piston plunger 77 moves toward seat 82 and restricts the flow through chamber 80 to outlet connection 90 when the pressure on the underside of diaphragm 74 exceeds the pressure exerted by knob 86 upon piston 76 and the pressure upon the top side of diaphragm 73.

The same process of pressure comparison is repeated in relays 92 and 100 so that the combined effect of the three cascaded booster relays is to amplify the pressure gain by a factor of 72 and the volume gain caused by an expansion of the fluid in passing through the relays by a factor of 60.

Obviously, the interconnected series of booster relays 70, 92 and 100 could be replaced by a single booster relay having the desired pressure gain of 72 and the volume gain of 60. In such a booster relay, the area of the upper diaphragm would be 72 times as great as the area of the lower diaphragm, and the fluid would expand within the relay by a factor of 60 before reaching the output connection 106.

Output connection 106 from relay 100 returns a signal to control channel 38 of amplifier A for feedback control purposes via conduit 112. Vent channel 115 and constrictions 113 and 116 reduce the pressure level of the feedback flow in conduit 112 to a pressure level of 0–.433 p.s.i., or a maximum level approximately twice that of the control signal pressure level in channel 36 of amplifier A at maximum values. This pressure differential is desirable to insure effective control of the fluid stream under actual conditions of operation.

If the feedback signal introduced at control channel 38 is at a higher pressure level than the pressure level of the signal from transmitter 14 introduced at control channel 36 after the above described proportional pressure reduction, then the stream at output passage 32 of amplifier A will increase and consequently the signal at control channel 52 of amplifier B will also be increased in pressure. A greater proportion of the flow of fluid from supply channel 50 will be deflected to output channel 56 and vented to atmosphere. The proportion of flow in output passage 58 will be correspondingly decreased, so that conduit 69 will convey a weaker signal to the relay section and hence feedback conduit 112, will, in turn, convey a signal of diminished pressure to control channel 38 of amplifier A after undergoing the above described proportional pressure reduction by members 113, 115 and 116. Controller 114 will be adjusted by the pressure in outlet 106, but prior to the proportional pressure drop in the feedback network.

Conversely, if the fluid signal in output connection 106, feedback conduit 110, and input channel 38, is at a lower pressure level than the fluid signal issuing from transmitter 14 into control channel 36, then a greater proportion of the main power stream issuing from supply channel 28 will be deflected into output passage 34 than into output passage 32 of amplifier A. Due to the cross-coupling of tubes 46 and 48, the flow in output passage 34 is introduced into amplifier B as a fluid signal in control channel 54 while the flow in output passage 32 becomes the control signal in control channel 52 of amplifier B.

The control signal or signals issuing from channels 52 and 54 contact and proportionately deflect the power stream issuing from supply channel 50. Channel 50 is pressurized from a low pressure source via supply conduit 24 and branch conduit 26. The higher pressure level signal issuing from control channel 54 will deflect a proportionately greater amount of fluid into output passage 58 than into output passage 56. The flow exiting from passage 58 is fed into the booster relay section by conduit 69. The fluid signal is greatly amplified in pressure and volume in the booster section so that the fluid flow through outlet connection 106 and conduit 110 is of sufficient magnitude to actuate controller 114. Simultaneously, a signal of reduced pressure is returned to amplifier A over feedback conduit 112.

Under certain operating conditions, such as when the heat in an enclosure has attained the temperature setting on a thermostat, equilibrium conditions are realized. Equilibrium condition is manifested by the pressure level at control channel 38 introduced by feedback channel 112 being substantially equal to the pressure level of the fluid flow at control channel 36. The main power stream in amplifier A will not be deflected, but will be maintained in dynamic equilibrium so that the stream will be directed against the apex of flow divider 30, and be divided evenly into two streams issuing from passages 32 and 34. Then the cross-coupled tubes 46 and 48 will introduce the equal flow from the output passages of amplifier A as control signals of equal pressure at control channels 52 and 54 of amplifier B. The power stream issuing from supply channel 50 will also be retained in dynamic equilibrium by the two control signals and will respond by being evenly divided between channels 56 and 58. Channel 56 is exhausted to the atmosphere, while the flow through output passage 58 will continue through conduit 69 to the feedback network. Controller 114 will be actuated in accordance with the pressure level in the connection 106 and conduit 110.

What is claimed is:
1. A fluid control system comprising:
 (a) first conduit means adapted to be connected to a high pressure source of fluid,
 (b) second conduit means adapted to be connected to a low pressure source of fluid,
 (c) transmitter means connected to said first conduit means,
 (d) said transmitter means varying a first fluid signal in response to a variable condition.
 (e) fluid amplifier means including inlet means, control means, and outlet means,
 (f) said second conduit means connected to said inlet means for issuing a fluid power stream,
 (g) said outlet means positioned downstream of said inlet means for receiving the power stream,
 (h) said control means disposed between said inlet and outlet means along the flow path of the power stream,
 (i) said control means connected to said transmitter means for receiving a first signal therefrom,
 (j) feedback network means connected between said outlet means and said control means for producing a second signal,
 (k) said control means deflecting the power stream by the interaction of said first and second fluid signals with the power stream, and
 (l) controller means operatively connected to said feedback network means, said controller means including flow responsive means communicating with the second signal passing through the feedback network means for adjusting the variable condition in response to said second signal.

2. The control system as defined in claim 1 wherein said amplifier means includes a pair of operatively interconnected proportional fluid amplifiers wherein the fluid passing between said inlet means and said outlet means is the only moving portion of said amplifiers.

3. The control system as defined in claim 2 wherein each of said amplifiers has inlet means consisting of a supply channel, control means comprising a pair of control channels disposed transversely to said supply channel and on opposite sides thereof, outlet means comprising a pair of output passages, said supply channels of said amplifiers being connected to said second conduit means to introduce a supply of fluid at low pressure to said amplifiers, and the output passages of the first amplifier being connected to the control channels of the second amplifier to proportionately deflect the flow of fluid passing between said supply channel and said output passages.

4. The control system as defined in claim 3 wherein said output passages of said first amplifier are cross-coupled to said control channels of said second amplifier.

5. The control system as defined in claim 3 wherein each of said amplifiers has a flow divider located downstream of said supply channel and in line therewith, said output passages being located adjacent to each side of said flow divider, and said flow divider normally splitting the flow from said supply channels into two equal streams in said output passages.

6. The control system as defined in claim 1 wherein said feedback network means comprises booster relay means for increasing the pressure of the second signal at the outlet means of said fluid amplifier means to the operating level of the flow responsive means within said controller means.

7. The control system as defined in claim 6 wherein said feedback network means further comprises a feedback conduit connected at one end to the downstream side of said booster relay means, said feedback conduit being connected at its opposite end to said control means of said fluid amplifier means, said feedback conduit including resistance means and venting means for reducing the pressure of the second signal to the operating level of the fluid amplifier means.

8. The control system as defined in claim 6 wherein said booster relay means comprises a series of operatively interconnected booster relays, each relay including a housing with inlet conduit means, an outlet conduit, and pressure responsive means disposed therebetween to regulate the fluid flow between said inlet conduit means and said outlet conduit.

9. The control system as defined in claim 8 wherein said inlet conduit means of the first of said series of booster relays is connected to the outlet means of said fluid amplifier means and the outlet conduit of the last of said series of booster relays is connected to said feedback conduit.

10. The control system as defined in claim 8 wherein said inlet conduit means of the booster relay means comprises a first and a second inlet conduit, and said pressure responsive means of the booster relay means comprises a pair of diaphragms, one of said diaphragms communicating with the fluid flow at said first inlet conduit and the other of said diaphragms communicating with the fluid flow at said second inlet conduit.

11. The control system as defined in claim 8 wherein each of said booster relays further includes control means, said control means comprising a manually adjustable knob, a movable piston, a chamber and a spring seated within said chamber biasing said piston to seal said chamber, said knob exerting a biasing force upon said piston in opposition to the biasing force of said spring.

References Cited

UNITED STATES PATENTS

| | | | |
|---|---|---|---|
| 2,773,506 | 12/1956 | Bauer | 137—86 |
| 2,858,075 | 10/1958 | May et al. | 137—86 XR |
| 2,985,183 | 5/1961 | Peatross | 137—86 |
| 3,113,582 | 12/1963 | Hudson | 137—85 XR |
| 3,115,147 | 12/1963 | Mueller | 137—85 XR |
| 3,193,197 | 7/1965 | Bauer | 137—81.5 XR |
| 3,339,571 | 9/1967 | Hatch | 137—81.5 |

SAMUEL SCOTT, Primary Examiner